US006061648A

United States Patent [19]

Saito

[11] Patent Number: 6,061,648

[45] Date of Patent: May 9, 2000

[54] SPEECH CODING APPARATUS AND SPEECH DECODING APPARATUS

[75] Inventor: Akitoshi Saito, Hamamatsu, Japan

[73] Assignee: Yamaha Corporation, Shizuoka-ken, Japan

[21] Appl. No.: 09/030,910

[22] Filed: Feb. 26, 1998

[30] Foreign Application Priority Data

Feb. 27, 1997 [JP] Japan .................................... 9-044223

[51] Int. Cl.[7] ................................................ G10L 15/20

[52] U.S. Cl. .......................... 704/219; 704/230; 704/218; 704/222; 704/217; 381/94.1

[58] Field of Search ..................................... 704/217, 218, 704/219, 214, 222, 237, 230; 381/94.1; 367/80, 90

[56] References Cited

U.S. PATENT DOCUMENTS

| | | | |
|---|---|---|---|
| 4,304,965 | 12/1981 | Blanton et al. | 704/258 |
| 4,544,919 | 10/1985 | Gerson | 340/347 |
| 4,903,303 | 2/1990 | Taguchi | 704/216 |
| 4,944,036 | 7/1990 | Hyatt | 367/43 |
| 5,127,053 | 6/1992 | Koch | 704/219 |
| 5,539,832 | 7/1996 | Weinstein et al. | 381/94.1 |
| 5,596,676 | 1/1997 | Swaminathan et al. | 704/208 |
| 5,706,402 | 1/1998 | Bell | 395/23 |
| 5,717,819 | 2/1998 | Emeott et al. | 704/221 |
| 5,774,837 | 6/1998 | Yeldener et al. | 704/208 |
| 5,797,118 | 8/1998 | Saito | 704/222 |
| 5,917,919 | 6/1999 | Rosenthal | 381/71.11 |

OTHER PUBLICATIONS

Widrow et al., ("Adaptive Noise Cancelling : Principles and Applications," IEEE vol. 63, No. 12, Dec. 1975, pp. 1692–1716).

*Primary Examiner*—David R. Hudspeth
*Assistant Examiner*—Vijay B. Chawan
*Attorney, Agent, or Firm*—Reed Smith Hazel & Thomas LLP

[57] ABSTRACT

In a speech coding apparatus, an input device inputs a mixed speech signal of a plurality of speakers. A separating device analyzes period characteristics of the input mixed speech signal, and separates the same signal into a plurality of single speech signals each associated with a corresponding one of the speakers, based on a result of the analysis. A first extracting device extracts source speech characteristic parameters included in each of the single speech signals. A second extracting device extracts a generic vocal-tract characteristic parameter from the input mixed speech signal. In a speech decoding apparatus, a first input device inputs the source speech characteristic parameters for each of the speakers. A second input device inputs the vocal-tract characteristic parameter. A source speech decoder decodes source speech signals of the respective speakers, based on the source speech characteristic parameters for the speakers and forms a source speech signal for the speakers by synthesizing the decoded source speech signals of the respective speakers. A vocal-tract filter filters the source speech signal for the speakers, based on the generic vocal-tract characteristic parameter, so as to decode a mixed speech signal indicative of mixed speech of the speakers.

7 Claims, 7 Drawing Sheets

SPEECH CODING APPARATUS AND SPEECH DECODING APPARATUS

BACKGROUND OF THE INVENTION

1. Field of the Invention

The present invention relates to a speech coding apparatus and a speech decoding apparatus for compressing and encoding a speech signal and decoding the speech signal, respectively, by vector quantization (VQ).

2. Prior Art

A vector quantization method involving CELP (Code Excited Linear Predictive Coding) has been used in practice as a method for compressing and coding speech information with high efficiency in such a field as digital portable telephones, for example. FIG. 1 shows the construction of one known example of this kind of speech coding apparatus. Characteristics of speech or voice can be expressed by a pitch and a noise component (hereinafter referred to as "source speech characteristic parameters") of source speech generated from vocal cords of a speaker, and vocal-tract transmission characteristics given to the voice when it passes through the speaker's mouth and emission characteristics given to a voice when it passes through the speaker's lips (all of these characteristics will be referred to as "vocal-tract characteristic parameter"). In FIG. 1, a reflection coefficient analyzer 1 calculates a reflection coefficient r from an input speech signal, and outputs this coefficient r as a vocal-tract characteristic parameter. A long-term predictor 2 extracts a pitch L that is substantially equivalent to the fundamental frequency of the input speech signal. A residual component obtained by removing characteristics in the form of the reflection coefficient r and pitch L from the input speech signal is approximated by a code vector selected from a set of code vectors in a source-speech codebook 3. An index I that specifies this code vector and the pitch L provide source speech characteristic parameters. More specifically, a synthesizer 4 synthesizes a predicted decoded speech signal based on the pitch L and received from a long-term predictor 2, and the code vector selected from the codebook 3, and the thus synthesized waveform is passed through a throat approximation filter 5 that operates based on the reflection coefficient r, to provide a locally decoded speech signal. An error between this locally decoded speech signal and the input speech signal is calculated by a subtracter 6. Then, a code vector that minimizes this error is selected from the set of code vectors in the source-speech codebook 3, and an index I indicative of the selected code vector, reflection coefficient r and pitch L are output or transmitted along with gain information for the respective parameters.

A speech decoding apparatus, on the other hand, receives the index I and pitch L, decodes the input signal to reproduce a source speech signal, using the same source-speech codebook and decoding method as used in the speech coding apparatus, and passes the source speech signal through a throat approximation filter operating based on the reflection coefficient r that has been separately given to the filter, so as to reproduce the speech represented by the input signal.

In the known speech coding and speech decoding apparatuses described above, encoding and decoding of a speech signal are performed assuming that the speech signal represents only single speech having such characteristics as described above. Thus, the speech coding apparatus is not able to encode mixed speech of a plurality of speakers with sufficiently high accuracy. Namely, a source speech signal derived in the case of mixed speech of a plurality of speakers contains a plurality of pitch information that differ from one speaker to another, and the mixed speech has more complicated vocal-tract characteristics than speech by a single speaker. Accordingly, the speech coding apparatus and speech decoding apparatus described above cannot be suitably used in such applications that a conversation is held between one speaker and a plurality of speakers or between a plurality of speakers and a plurality of speakers, for example.

SUMMARY OF THE INVENTION

It is therefore an object of the invention to provide a speech coding apparatus capable of encoding a speech signal representing mixed speech of a plurality of speakers at a high compression ratio, by extracting a vocal-tract characteristic parameter and source speech characteristic parameters, and a speech decoding apparatus capable of decoding the thus encoded speech signal in a similar manner to reproduce the speech of the plural speakers.

To attain the above object, the present invention provides an apparatus for coding a speech signal, comprising an input device that inputs a mixed speech signal of a plurality of speakers, a separating device that analyzes period characteristics of the input mixed speech signal entered by the input device, and separates the input mixed speech signal into a plurality of single speech signals each associated with a corresponding one of the plurality of speakers, based on a result of the analysis, a first extracting device that extracts source speech characteristic parameters included in each of the single speech signals derived by the separating device, the source speech characteristic parameters representing characteristics of source speech generated from vocal cords of each of the speakers, a second extracting device that extracts a generic vocal-tract characteristic parameter from the input mixed speech signal, the generic vocal-tract characteristic parameter representing a vocal-tract characteristic shared by the plurality of speakers, and an output device that outputs the source speech characteristic parameters extracted by the first extracting device, and the vocal-tract characteristic parameter extracted by the second extracting device.

The speech coding apparatus of the present invention is based on the recognition that mixed speech of a plurality of speakers can be expressed by linearly adding signals representing single speeches of the respective speakers. Acccording to the speech coding apparatus of the present invention, the number of the speakers is specified by analyzing period characteristics of an input speech signal by autocorrelation operations and others, for example, and the input signal representing the mixed speech of the plural speakers is separated or divided into a plurality of single speech signals. Source speech characteristic parameters are extracted with respect to the separated speech signal of each of the speakers. As a result, characteristics of source speeches of the plurality of speakers can be respectively extracted or derived with high accuracy by a method similar to a known method. Although the amount of coded information is increased due to an increase in the number of the source speech characteristic parameters required for the same number of speakers, a generic vocal-tract characteristic parameter that represents vocal-tract characteristics of mixed speech is extracted from the input speech signal, with a result of reduction in the amount of coded information, thus allowing speech of the plurality of speakers to be encoded without significantly reducing the compression ratio.

Preferably, the separating device calculates an autocorrelation parameter based on the input mixed speech signal, detects peaks of the calculated autocorrelation parameter, and generates each of the single speed signals associated with a corresponding one of the plurality of speakers which has a period based on the detected peaks.

Further preferably, the separating device includes a plurality of sets of an autocorrelation operating block that calculates the autocorrelation parameter based on the input mixed speech signal, and a synthesizer that detects peaks of the calculates autocorrection parameter and generates one of the single speed signals associated with a corresponding one of the plurality of speakers which has a period based on the detected peaks, and wherein a difference between a single speech signal generated by a first set of the autocorrelation operating block and the synthesizer and the input mixed speech signal is sent as the the input mixed speech signal to a second set to generate a second single speech signal, followed by sequentially executing similar operations of generating single speech signals by respective subsequent sets.

In an alternative form, the separating device and the first extracting device comprise a vocal-tract filter that filters the input mixed speech signal based on the generic vocal-tract characteristic parameter to remove vocal-tract characteristics from the input speech signal to thereby generate a single source speech signal, a cross-correlation operating device that determines one of the source speech characteristic parameters, based on cross-correlation between the single source speech signal and a single source speech signal previously obtained, and a decoder that generates each of the single speech signals associated with a corresponding one of the plurality of speakers, based on the determined source speech characteristic parameter.

In a preferred embodiment of the invention, the speech decoding apparatus further comprises a source speech decoder that decodes source speech signals of the respective speakers, based on the source speech characteristic parameters extracted by the first extracting device with respect to the plurality of speakers, respectively, and forms a source speech signal for the plurality of speakers by synthesizing the decoded source speech signals of the respective speakers, a vocal-tract filter that filters the source speech signal for the plurality of speakers formed by the source speed decoder, based on the generic vocal-tract characteristic parameter extracted by the second extracting device, so as to decode a mixed speech signal indicative of mixed speech of the plurality of speakers, an error detector that detects an error between the mixed speech signal decoded by said vocal-tract filter and the input mixed speech signal, wherein the first extracting device extracts one of the source speech characteristic parameters so as to minimize the error detected by the error detector.

Preferably, the second extracting device extracts a reflection coefficient as the vocal-tract characteristic parameter, the reflection coefficient being applied as a filter coefficient to the vocal-tract filter.

To attain the above object, the present invention also provides an apparatus for decoding a speech signal, comprising a first input device that inputs source speech characteristic parameters for each of a plurality of speakers, the source speech characteristic parameters representing characteristics of source speech generated from vocal cords of each of the speakers, a second input device that inputs a vocal-tract characteristic parameter that represents a generic vocal-tract characteristic shared by the plurality of speakers, a source speech decoder that decodes source speech signals of the respective speakers, based on the source speech characteristic parameters for the plurality of speakers that are entered by the first input device, and forms a source speech signal for the plurality of speakers by synthesizing the decoded source speech signals of the respective speakers, and a vocal-tract filter that filters the source speech signal for the plurality of speakers formed by the source speed decoder, based on the generic vocal-tract characteristic parameter entered by the second input device, so as to decode a mixed speech signal indicative of mixed speech of the plurality of speakers.

In the speech decoding apparatus of the present invention, a source speech signal of each of the speakers is synthesized and decoded based on the source speech characteristic parameters for the respective speakers, and the resulting source speech signal is filtered by use of a generic vocal-tract characteristic parameter shared by the plurality of speakers. Thus, the present apparatus is able to decode the mixed speech signal of the plurality of speakers with high accuracy.

The above and other objects, features and advantages of the invention will become more apparent from the following detailed description taken in conjunction with the accompanying drawings.

DETAILED DESCRIPTION OF THE PREFERRED EMBODIMENT

Some preferred embodiments of the present invention will be described in detail with reference to the drawings.

Figure 1:
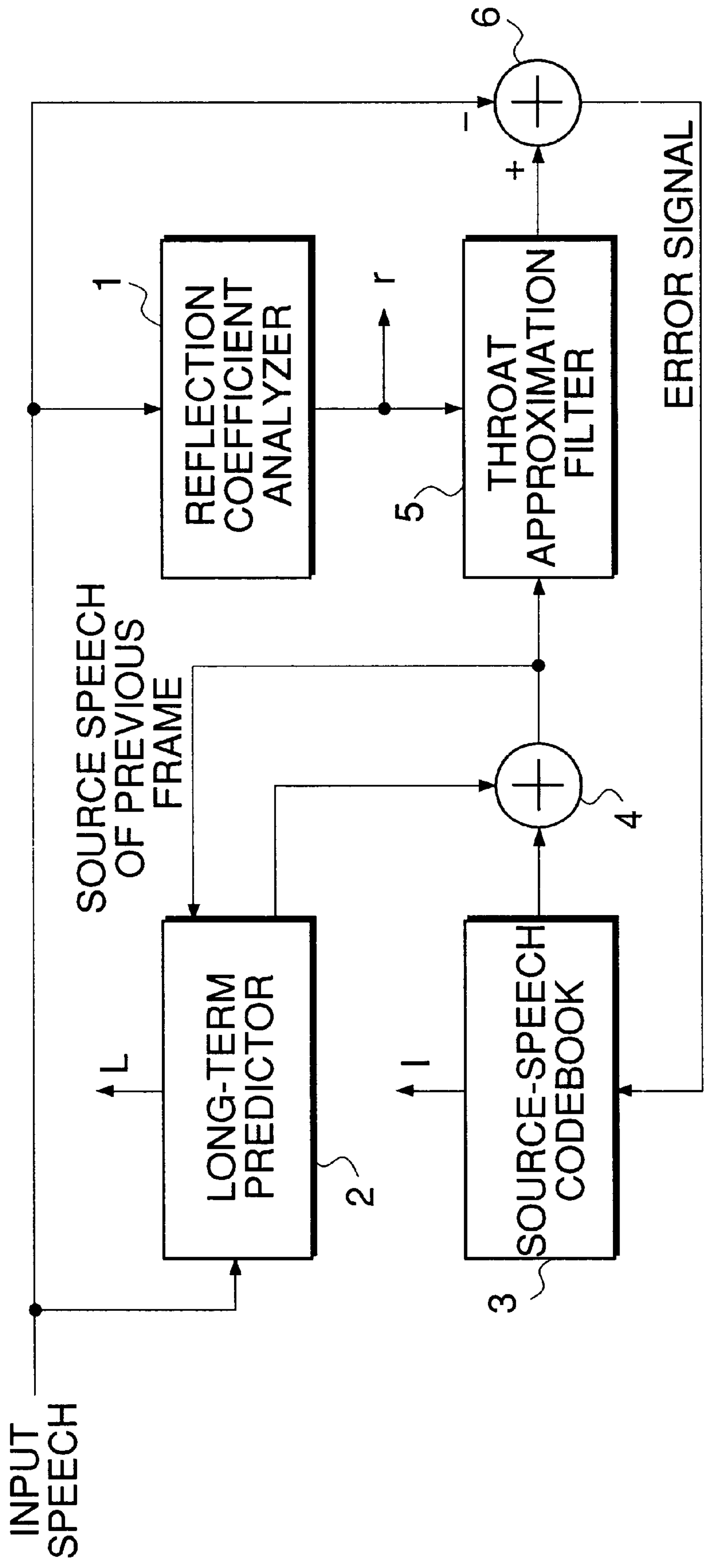
FIG.1 PRIOR ART
FIG. 1 is a block diagram showing the construction of one known example of CELP speech coding apparatus.
Figure 2:
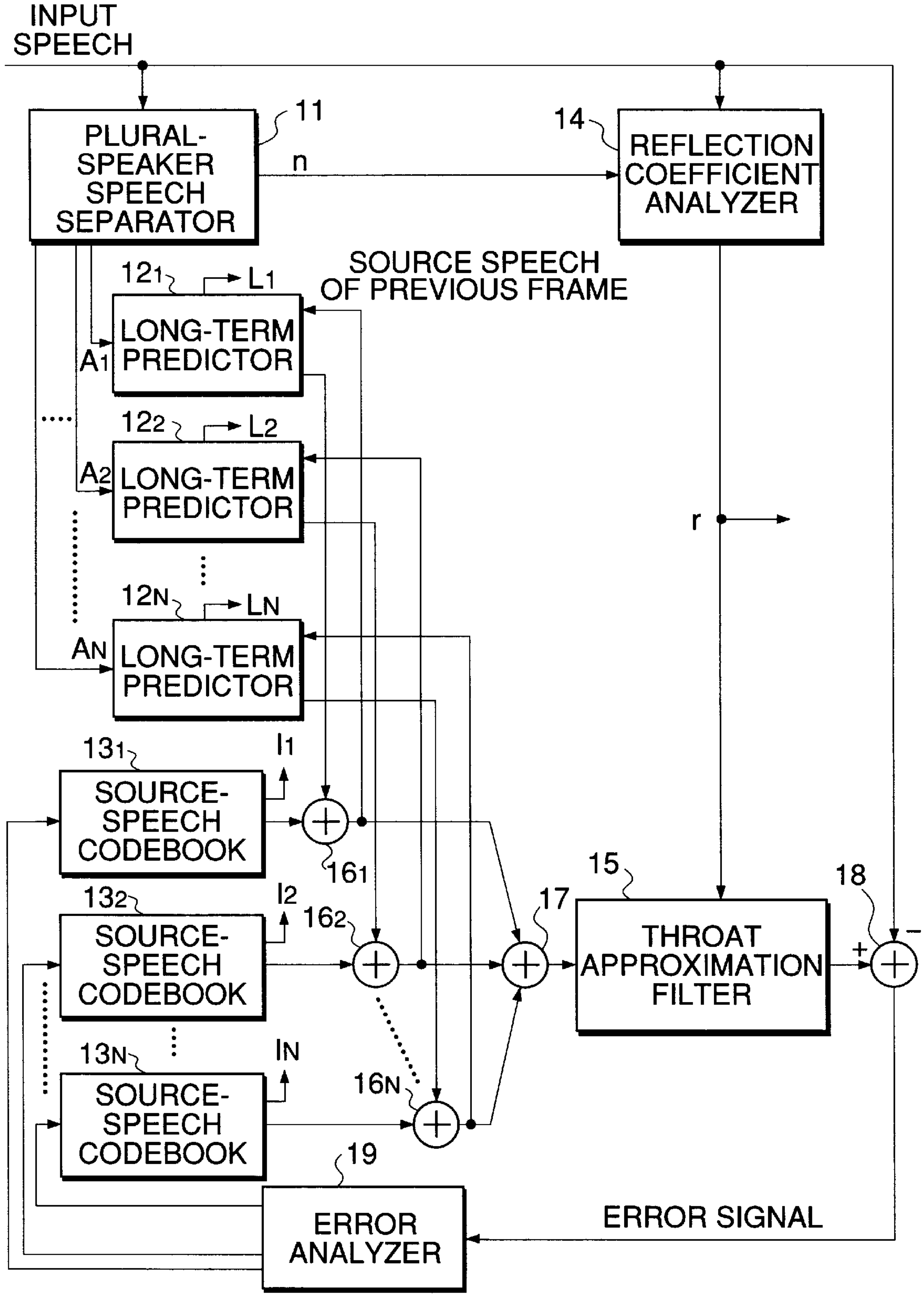
FIG. 2 is a block diagram schematically showing the construction of a speech coding apparatus according to one embodiment of the present invention.

Referring first to FIG. 2, there is shown the construction of a CELP speech coding apparatus as a speech coding apparatus according to one embodiment of the invention.

This speech coding apparatus is adapted to deal with an input speech signal that represents speech of a plurality of speakers, and is comprised of a plural-speaker speech separator 11 for separating or dividing the input speech signal into a plurality of speech signals each representing speech of each of the speakers, N sets of long-term predictors $\mathbf{12}_1$, $\mathbf{12}_2$, . . . , $\mathbf{12}_N$, and source-speech codebooks $\mathbf{13}_1$, $\mathbf{13}_2$, . . . , $\mathbf{13}_N$, a reflection coefficient analyzer 14 that calculates a generic reflection coefficient r of the input speech signal using an order of magnitude that depends upon the number of speakers, a throat approximation filter 15, N pieces of adders 16$_1$, 16$_2$, . . . , 16$_N$, an adder 17, a subtracter 18, and an error analyzer 19. In the following description, suffix N represents the number of devices employed in the apparatus, and suffix n represents the number of devices, signals or parameters that are selected or are output in response to the number of speakers n.

The plural-speaker speech separator 11 specifies the number of speakers n by analyzing period characteristics of the input speech signal, and separates the input signal into several speech signals each representing speech of each of the speakers, to output source speech signals $A_1, A_2, \ldots A_N$, associated with the respective speakers. The number of speakers n obtained by the plural-speaker speech separator 11 is supplied to the reflection coefficient analyzer 14. The reflection coefficient analyzer 14 calculates a reflection coefficient r, using an order of magnitude that depends upon the number of speakers n, for example, 10th order in the case of one speaker, 15th order in the case of two speakers, and 20th order in the case of more than two speakers. The reflection coefficient r may be calculated by executing FLAT (fixed-point covariant lattice type algorithm) using autocorrelation of the input speech signal. The reflection coefficient r thus calculated is supplied to the throat approximation filter 15.

On the other hand, the source speech signals $A_1, A_2, \ldots, A_n$ derived from the input speech signal by the plural-speaker speech separator 11 are transmitted to n pieces of long-term predictors 12$_1$, 12$_2$, . . . , 12$_n$, respectively. The long-term predictors 12$_1$–12$_n$ extract pitches $L_1$–$L_n$ of the source speech signals ($A_1$–$A_n$), respectively, through cross-correlation between these source speech signals $A_1$–$A_n$ and source speech signals of a previous frame, for example. Predicted decoded speech signals from the long-term predictors 12$_1$–12$_n$ that are respectively obtained based on the pitches $L_1$–$L_n$ and code vectors received from the source-speech codebooks 13$_1$–13$_n$ are added together by the adders 16$_1$–16$_n$, respectively, so that source speech signals associated with the respective speakers are decoded. The adder 17 obtains a sum of these source speech signals for the plurality of speakers, and the throat approximation filter 15 gives a vocal-tract characteristic to the resulting signal, to thus provide a locally decoded signal. The subtracter 18 subtracts the input speech signal from this locally decoded signal, and the error analyzer 19 receives an error signal as a result of the subtraction from the subtracter 18, and sequentially determines indexes $I_1$–$I_n$ of the source-speech codebooks 13$_1$–13$_n$ so that the error signal is minimized.

The operation and each component of the thus constructed speech coding apparatus will be now explained in detail.

Figure 3A:
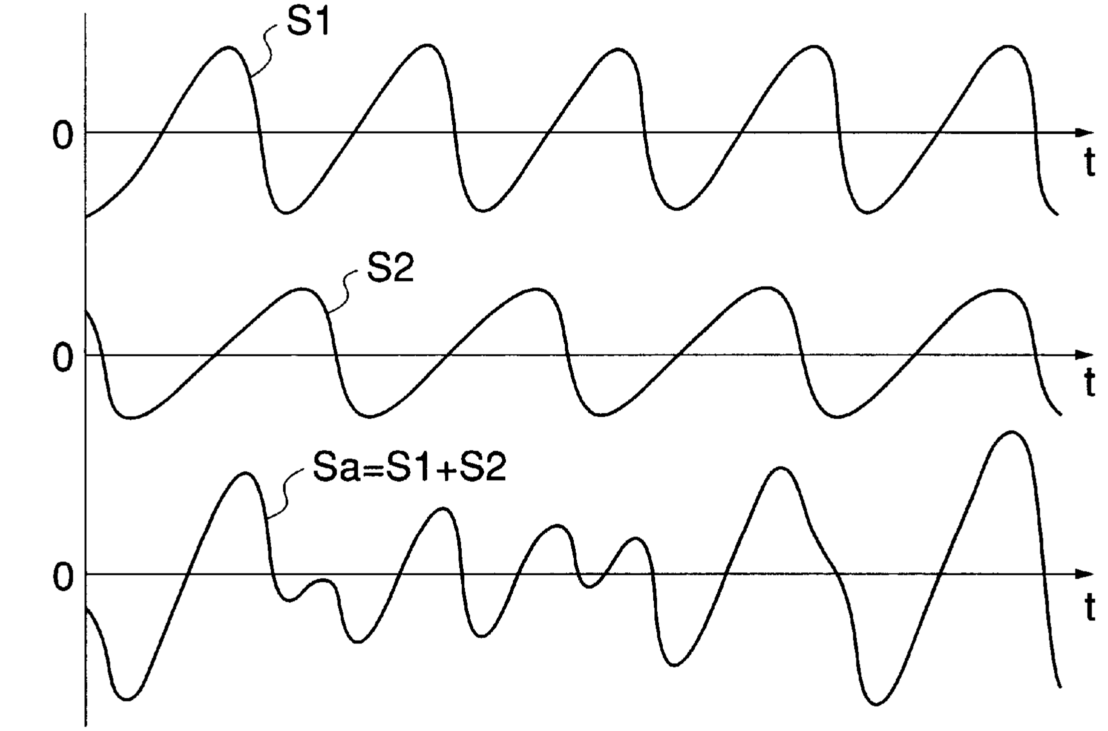
FIG. 3A is a waveform diagram showing transition of two kinds of simplified single source speech signals, and transition of a mixed speech signal obtained by mixing these source speech signals.
Figure 3B:
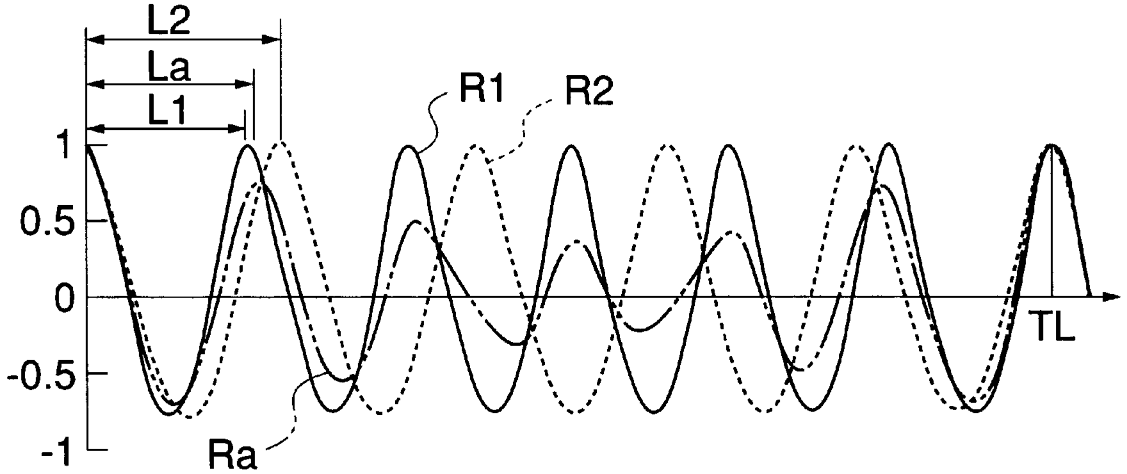
FIG. 3B is a diagram showing an example of characteristics of autocorrelation coefficients of respective speech signals of FIG. 3A.

FIG. 3A is a waveform diagram showing waveforms of single source speech signals and a mixed speech signal, which are simplified for the sake of explanation. FIG. 3B is a diagram showing autocorrelation coefficients of the respective speech signals of FIG. 3A. In FIG. 3A, each of S1, S2 represents a source speech signal indicative of speech of a single speaker, and Sa represents a mixed speech signal obtained as a linear sum of these source speech signals S1, S2. In FIG. 3B, R1, R2 and Ra are autocorrelation coefficients of the source speech signals S1, S2 and Sa, respectively.

When an input speech signal is a single speech signal S1, S2, large peaks of the autocorrelation coefficient appear at a particular lag (pitch) L1, L2. Although some other small peaks appear in an actual input speech signal, the lag L1, L2 can be specified by detecting a relatively large peak (hereinafter referred to as "first peak") that exist in the range of 3 to 10 ms, since the fundamental frequency of voices is in the range of 100 to 300 Hz. In the case of a mixed speech signal Sa, a lag La at which the first peak appears exists between L1 and L2, and has a value that is closer to that of the first peak of the speech signal having a larger amplitude. If the autocorrelation coefficients are observed for a little longer period of time, however, uniform peaks periodically appear at an interval corresponding to the lag L1, L2 in the case of the single speech signal, whereas periodic peaks of the autocorrelation coefficient of the mixed speech signal vary to a greater extent than those of the single speech signal. A large peak appears in the autocorrelation coefficient of the mixed speech signal Sa, at the end of a large period TL that corresponds to the least minimum multiple of the periods of the single speech signals S1, S2.

Figure 4:
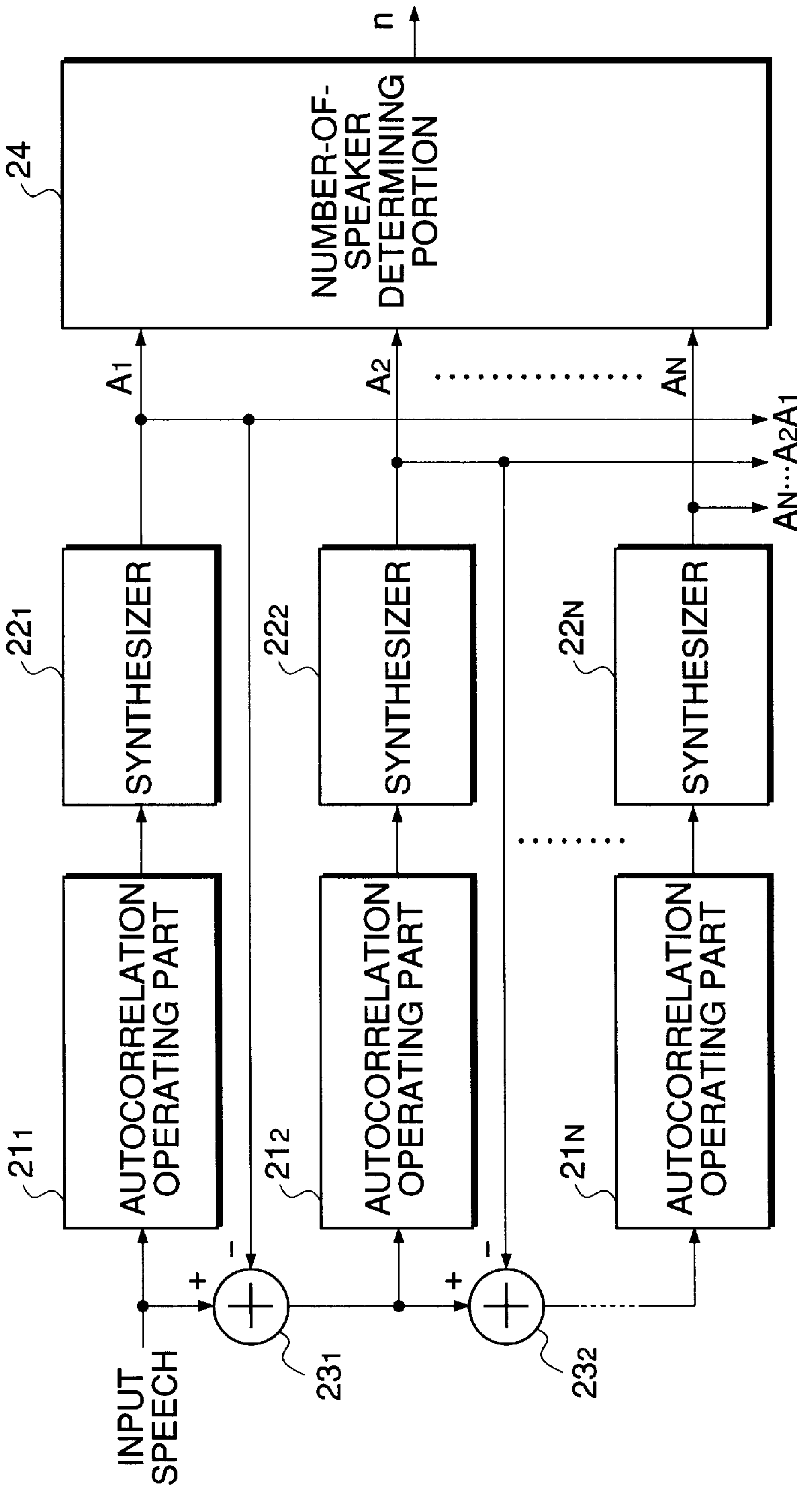
FIG. 4 is a block diagram showing in detail the construction of a plural-speaker speech separator of the apparatus of FIG. 2.

With the above waveforms of signals taken into consideration, the plural-speaker speech separator 11 is constructed as shown in FIG. 4, for example.

An input speech signal is first received by an autocorrelation operating block 21$_1$ where the autocorrelation coefficient of the input signal is calculated. A synthesizer 22$_1$ synthesizes a source speech signal A1 associated with the first speaker, from a pattern of the autocorrelation coefficient calculated by the operating block 21$_1$. More specifically, the synthesizer 22$_1$ detects a lag Lf of the first peak from the autocorrelation coefficient, and then detects a lag Lm at which the maximum peak is observed within a predetermined range that follows the first peak. The synthesizer 22$_1$ then produces a false source speech signal $A_1$ having a period T1 obtained by Lm/int (Lm/Lf), where int(x) is an integer that is closest to x. The amplitude of the source speech signal $A_1$ is equal to a value obtained by multiplying the amplitude of the input speech signal by a coefficient of not greater than 1 that decreases in accordance with a shift amount between the lag Lf and the period T1.

Once the source speech signal $A_1$ is produced, a subtracter 23$_1$ subtracts this signal $A_1$ from the input speech signal, and the result of subtraction is supplied to the next autocorrelation operating block 21$_2$. Thereafter, source speech signals $A_2$, $A_3$ associated with the second and other speakers are sequentially synthesized by similar operations. Even if waveforms formed as the source speech signals $A_1$–$A_N$ are somewhat different from the actual waveforms, the residual signals produced in a certain stage are reflected in the next stage, and therefore no information is lost or missed. A number-of-speaker determining block 24 selects source speech signals $A_1$–$A_n$ each having an amplitude that is larger than a predetermined amplitude, from the source speech signals is $A_1$–$A_N$ produced by the synthesizers 22$_1$–22$_N$, and counts the number of the selected source speech signals $A_1$–$A_n$ to output "n" as the number of speakers. Alternatively, the number of speakers n may be determined depending upon whether an autocorrelation parameter is smaller than a certain value.

The source speech signals $A_1$–$A_n$ associated with n speakers, which are selected from the synthesized source speech signals $A_1$–$A_N$, are then transmitted to the long-term predictors 12$_1$–12$_n$ in the next stage. Since the source speech signals $A_1$–$A_n$, from which vocal-tract characteristics have been already removed, simulate typical vocal-cord signals, the long-term predictors 12$_1$–12$_n$ can immediately derive their pitches $L_1$–$L_n$ through cross-correlation between these signals $A_1$–$A_n$ and source speech signals in a previous frame, without requiring the signals $A_1$–$A_n$ to pass through an inverse throat approximation filter. Speech signals having respective pitches are synthesized based on the obtained pitches $L_1$–$L_n$, and indexes $I_1$–$I_n$ of code vectors to be added to these signals are sequentially selected from the source-speech codebooks 13$_1$–13$_n$.

The error analyzer 19 shown in FIG. 2 analyzes the period of the error signal received from the subtracter 18, to first determine index $I_1$ so that an error associated with an $L_1$-pitch component is minimized, and then determine index $I_2$ so that an error associated with an $L_2$-pitch component is minimized. In this manner, indexes $I_1$–$I_n$ of the source-speech codebooks 13$_1$–13$_n$ are determined one by one by a similar method. Consequently, the indexes $I_1$–$I_n$ can be obtained with high efficiency.

The pitches $L_1$–$L_n$ from the long-term predictors 12$_1$–12$_n$ and indexes $I_1$–$I_n$ of code vectors from the source-speech codebooks 13$_1$–13$_n$ are output through output terminals, not shown, and delivered to an external device.

Figure 5:
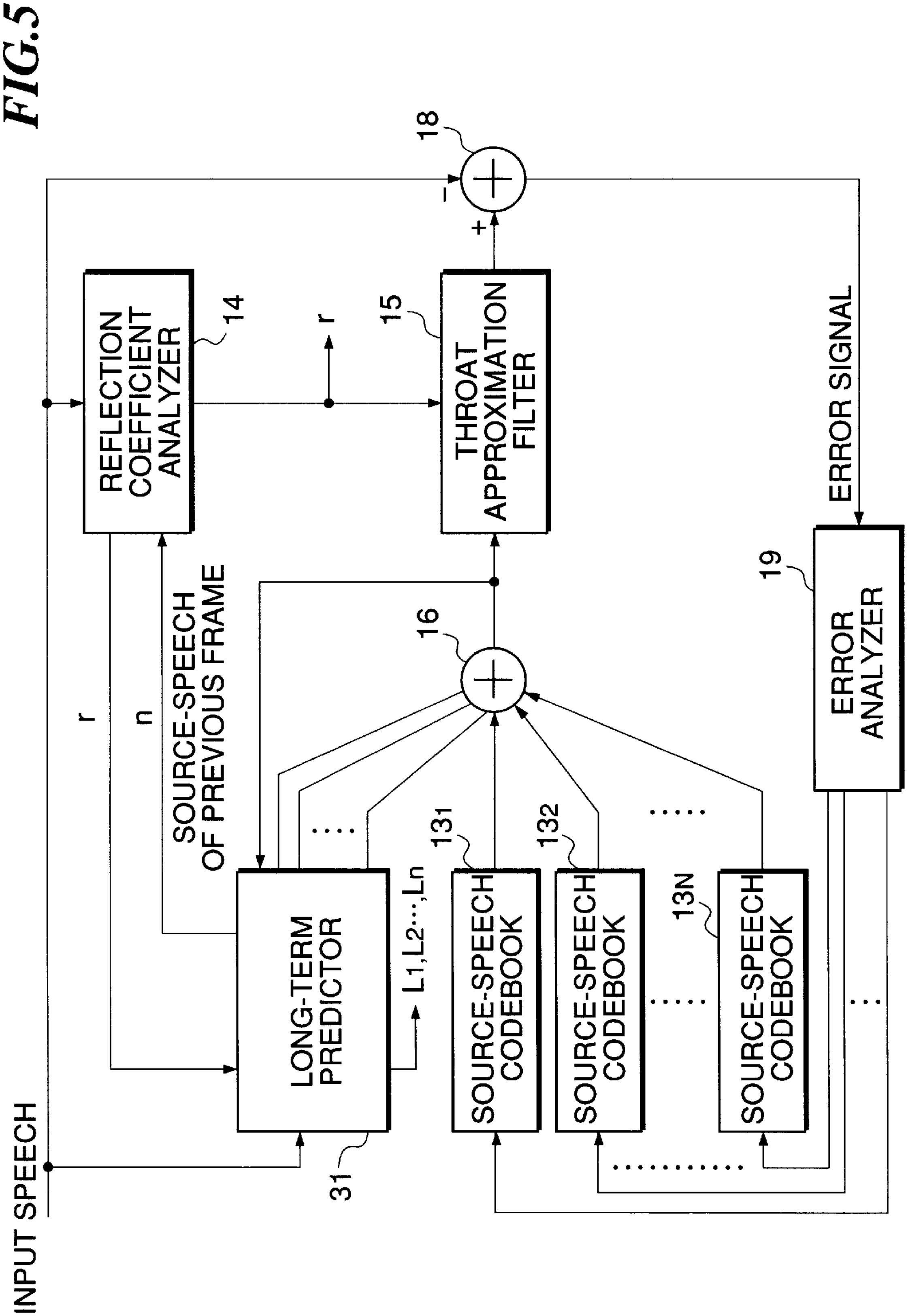
FIG. 5 is a block diagram schematically showing the construction of the speech coding apparatus according to another embodiment of the present invention.

In the present embodiment, the plural-speaker speech separator 11 separates the input speech signal into source speech signals associated with respective speakers, and the long-term predictors 12$_1$–12$_n$ extract pitches of the voices of the respective speakers. Since the plural-speaker speech separator 11 and long-term predictors 12$_1$–12$_N$ perform similar correlation operations, these operations may be reduced to a single process. FIG. 5 shows another embodiment of speech coding apparatus of the invention that is modified from the previous embodiment in this respect. In FIG. 5 corresponding elements to those in FIG. 2 are designated by identical reference numerals.

Figure 6:
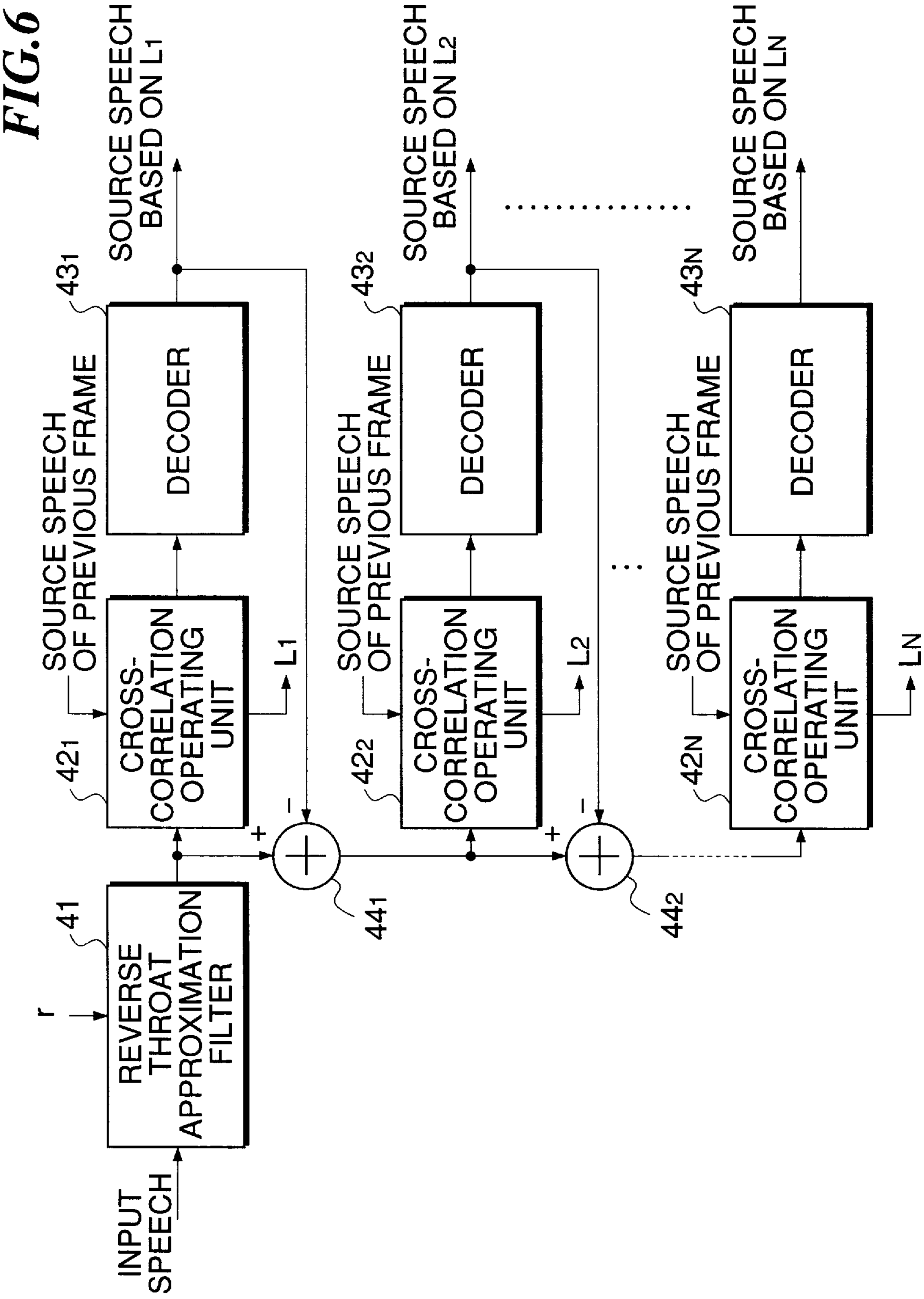
FIG. 6 is a block diagram showing in detail the construction of a long-term predictor of the apparatus of FIG. 5.

In the embodiment of FIG. 5, a long-term predictor 31 receives an input speech signal, and determines the number of speakers n and pitches $L_1$–$L_n$ of voices of the respective speakers. The long-term predictor 31 is constructed as shown in FIG. 6. Initially, an inverse throat approximation filter 41 removes vocal-tract characteristics from the input speech signal. A reflection coefficient r calculated by the reflection coefficient analyzer 14 is supplied to the inverse throat approximation filter 41. At first, the reflection coefficient analyzer 14 tentatively provides a low-order reflection coefficient r, since the number of speakers n has not yet been specified. Once the number speakers n is specified, the reflection coefficient analyzer 14 provides a reflection coefficient r having an order of magnitude that depends on the number of speakers n. A source speech signal from which vocal-tract characteristics have been removed at the inverse throat approximation filter 41 is then supplied to a cross-correlation operating unit 42$_1$ in the first stage, and pitch $L_1$ is determined based on cross-correlation between this source speech signal and a source speech signal in a previous frame. Then, a decoder 43$_1$ produces a source speech signal based on the thus determined pitch $L_1$, and a subtracter 44$_1$ subtracts the source speech signal produced by the decoder 43$^1$ from the original source speech signal. The residual signal is then supplied to a cross-correlation operating unit 42$_2$ in the second stage, where pitch $L_2$ is determined. Similar processing is repeated until cross-correlation performed in "m" stage is found to be smaller than a predetermined value, and "m−1" is determined as the number of speakers n. The following processing is similar to that of the previous embodiment, and thus will not be described herein. In this case, too, the residual component is reflected in the processing of the next stage, thus avoiding loss of information, and a code vector is determined with respect to each pitch component, whereby coding of the input speech signal can be achieved with reduced errors.

The reflection coefficient r, pitches $L_1$–$L_n$ and indexes $I_1$–$I_n$ calculated as described above are further subjected to vector quantization as needed, and then transmitted. It is also to be understood that gains, energies and others which were not particularly mentioned above, as well as the above parameters, are calculated with respect to the individual speakers, and transmitted. Although the number of speakers n, if transmitted to a receiver, makes it easy to set parameters and others on the receiver's side, there is no particular need to transmit the number of speakers n if pitches and indexes can be individually recognized or identified.

Figure 7:
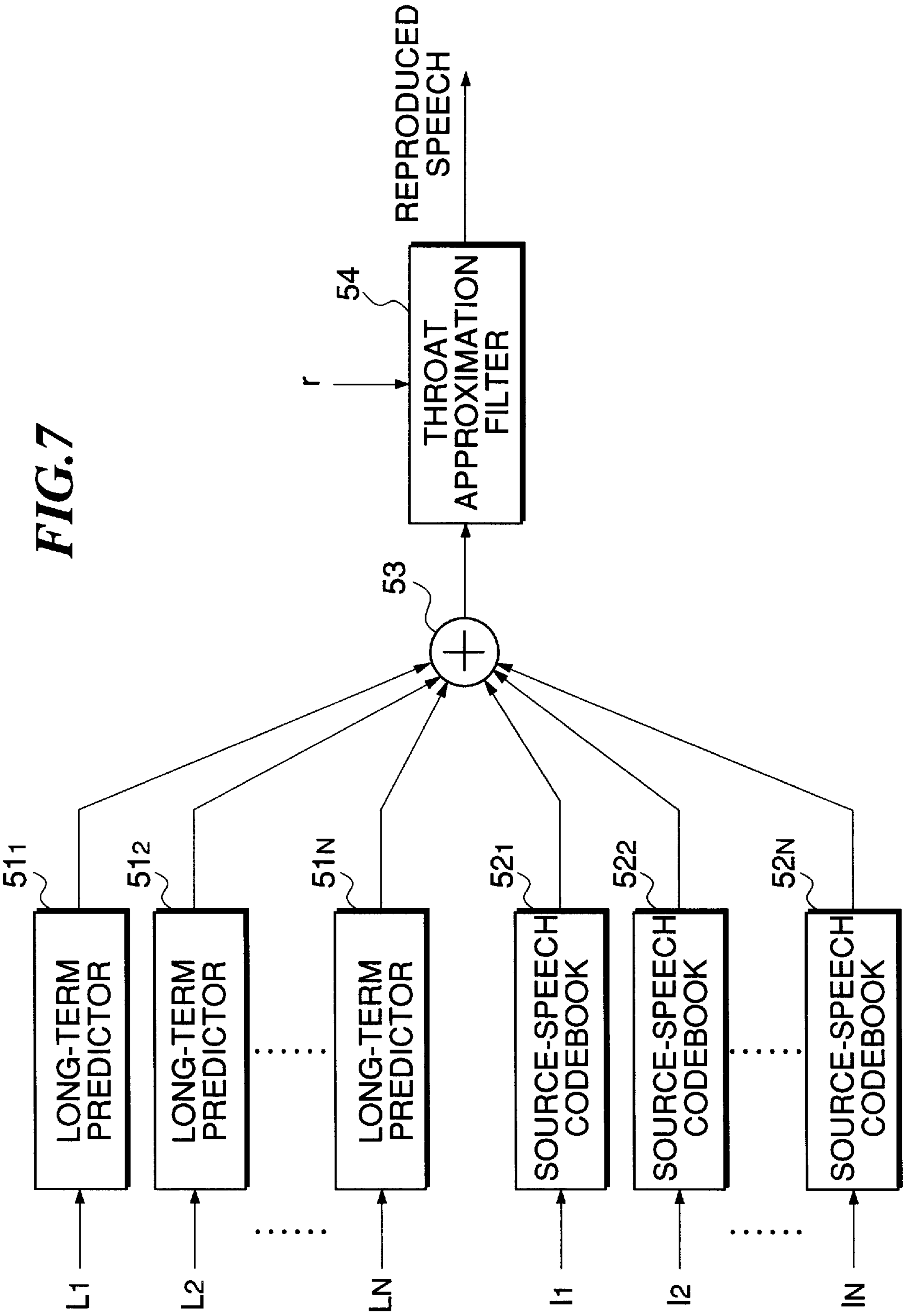
FIG. 7 is a block diagram schematically showing the construction of a speech decoding apparatus according to one embodiment of the present invention.

A speech decoding apparatus on the receiver's side, which is illustrated in FIG. 7 by way of example, is comprised of a plurality of long-term predictors 51$_1$–51$_N$, a plurality of source-speech codebooks 52$_1$–52$_N$, an adder 53, and a throat approximation filter 54, which correspond to those of the speech coding apparatus. This speech decoding apparatus decodes source speech signals associated with respective speakers, based on n sets of pitches $L_1$–$L_n$ and indexes $I_1$–$I_n$ transmitted from the speech coding apparatus, and synthesizes these source speech signals at the adder 53 to decode a source speech signal indicative of mixed speech. Then, the throat approximation filter 54 gives a vocal-tract characteristic to the source speech signal received from the adder 53, based on a reflection coefficient r that is separately received, so as to reproduce the speech.

What is claimed is:

1. An apparatus for coding a speech signal, comprising:

an input device that inputs a mixed speech signal of a plurality of speakers;

a separating device that analyzes period characteristics of the input mixed speech signal entered by said input device, and separates the input mixed speech signal into a plurality of single speech signals each associated with a corresponding one of the plurality of speakers, based on a result of the analysis;

a first extracting device that extracts source speech characteristic parameters included in each of the single speech signals derived by said separating device, said source speech characteristic parameters representing characteristics of source speech generated from vocal cords of each of the speakers;

a second extracting device that extracts a generic vocal-tract characteristic parameter from the input mixed speech signal, said generic vocal-tract characteristic parameter representing a vocal-tract characteristic shared by the plurality of speakers; and an output device that outputs the source speech characteristic parameters extracted by said first extracting device, and the vocal-tract characteristic parameter extracted by said second extracting device.

2. An apparatus as claimed in claim 1, wherein said separating device calculates an autocorrelation parameter based on the input mixed speech signal, detects peaks of the calculated autocorrelation parameter, and generates each of the single speed signals associated with a corresponding one of the plurality of speakers which has a period based on the detected peaks.

3. An apparatus as claimed in claim 2, wherein said separating device includes a plurality of sets of an autocorrelation operating block that calculates said autocorrelation parameter based on the input mixed speech signal, and a synthesizer that detects peaks of the calculates autocorrection parameter and generates one of the single speed signals associated with a corresponding one of the plurality of speakers which has a period based on the detected peaks, and wherein a difference between a single speech signal generated by a first set of said autocorrelation operating block and said synthesizer and the input mixed speech signal is sent as the the input mixed speech signal to a second set to generate a second single speech signal, followed by sequentially executing similar operations of generating single speech signals by respective subsequent sets.

4. An apparatus as claimed in claim 1, wherein said separating device and said first extracting device comprise a vocal-tract filter that filters the input mixed speech signal based on said generic vocal-tract characteristic parameter to remove vocal-tract characteristics from the input speech signal to thereby generate a single source speech signal, a cross-correlation operating device that determines one of said source speech characteristic parameters, based on cross-correlation between said single source speech signal and a single source speech signal previously obtained, and a decoder that generates each of the single speech signals associated with a corresponding one of the plurality of speakers, based on the determined source speech characteristic parameter.

5. An apparatus as claimed in claim 1, further comprising:

a source speech decoder that decodes source speech signals of the respective speakers, based on the source speech characteristic parameters extracted by said first extracting device with respect to the plurality of speakers, respectively, and forms a source speech signal for the plurality of speakers by synthesizing the decoded source speech signals of the respective speakers;

a vocal-tract filter that filters the source speech signal for the plurality of speakers formed by said source speed decoder, based on the generic vocal-tract characteristic parameter extracted by said second extracting device, so as to decode a mixed speech signal indicative of mixed speech of the plurality of speakers;

an error detector that detects an error between the mixed speech signal decoded by said vocal-tract filter and the input mixed speech signal;

wherein said first extracting device extracts one of said source speech characteristic parameters so as to minimize the error detected by said error detector.

6. An apparatus as claimed in claim 5, wherein said second extracting device extracts a reflection coefficient as the vocal-tract characteristic parameter, said reflection coefficient being applied as a filter coefficient to said vocal-tract filter.

7. An apparatus for decoding a speech signal, comprising:

a first input device that inputs source speech characteristic parameters for each of a plurality of speakers, said source speech characteristic parameters representing characteristics of source speech generated from vocal cords of each of the speakers;

a second input device that inputs a vocal-tract characteristic parameter that represents a generic vocal-tract characteristic shared by the plurality of speakers;

a source speech decoder that decodes source speech signals of the respective speakers, based on the source speech characteristic parameters for the plurality of speakers that are entered by said first input device, and forms a source speech signal for the plurality of speakers by synthesizing the decoded source speech signals of the respective speakers; and a vocal-tract filter that filters the source speech signal for the plurality of speakers formed by said source speed decoder, based on the generic vocal-tract characteristic parameter entered by said second input device, so as to decode a mixed speech signal indicative of mixed speech of the plurality of speakers.

* * * * *